United States Patent [19]

Wale

[11] 3,991,454
[45] Nov. 16, 1976

[54] FLUTE PIECES FOR ENGINEERS TOOLS
[75] Inventor: Dennis Harry Wale, Rothley, England
[73] Assignee: Marwin Cutting Tools Limited, Rothley, England
[22] Filed: Feb. 10, 1975
[21] Appl. No.: 548,364

[30] Foreign Application Priority Data
Feb. 11, 1974 United Kingdom.............. 06179/74

[52] U.S. Cl............................. 29/105 R; 29/103 A; 76/108 R; 408/59; 408/144; 408/210; 408/226
[51] Int. Cl.²........................................... B26D 1/12
[58] Field of Search ........... 408/210, 226, 229, 230, 408/144, 145, 59; 29/103 A, 105; 76/108 R, 108 T, DIG. 11, DIG. 12,

[56] References Cited
UNITED STATES PATENTS

| | | | |
|---|---|---|---|
| 1,887,372 | 11/1932 | Emmons | 408/144 |
| 1,964,030 | 6/1934 | Brush | 408/226 X |
| 1,977,845 | 10/1934 | Emmons | 408/144 X |
| 2,769,355 | 11/1956 | Crisp | 408/230 |
| 3,667,857 | 6/1972 | Shaner et al. | 408/230 |

FOREIGN PATENTS OR APPLICATIONS

| | | | |
|---|---|---|---|
| 18,916 | 1896 | United Kingdom | 29/96 |
| 1,279,238 | 6/1972 | United Kingdom | 29/95 A |

*Primary Examiner*—Leonidas Vlachos
*Attorney, Agent, or Firm*—Ralph W. Kalish

[57] ABSTRACT

A flute piece consisting of a piece of tungsten carbide twisted or formed such that the flute piece has at least two helical cutting edges and an axis through which the tungsten carbide material extends. The flute piece is intended for an engineers' tool for working ferrous or non-ferrous metal, plastics or wood, such as a twist drill or a milling or boring cutter for a machine tool. A shank member has an extension web on one end thereof which is provided with a helical slot for reception of the flute piece.

8 Claims, 26 Drawing Figures

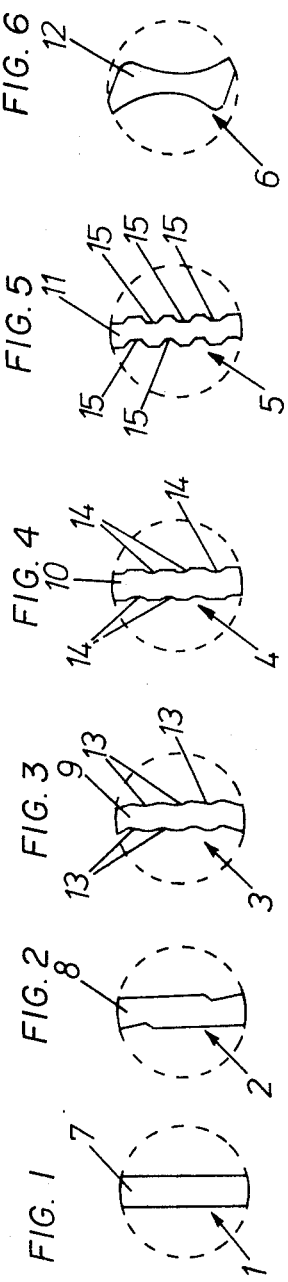
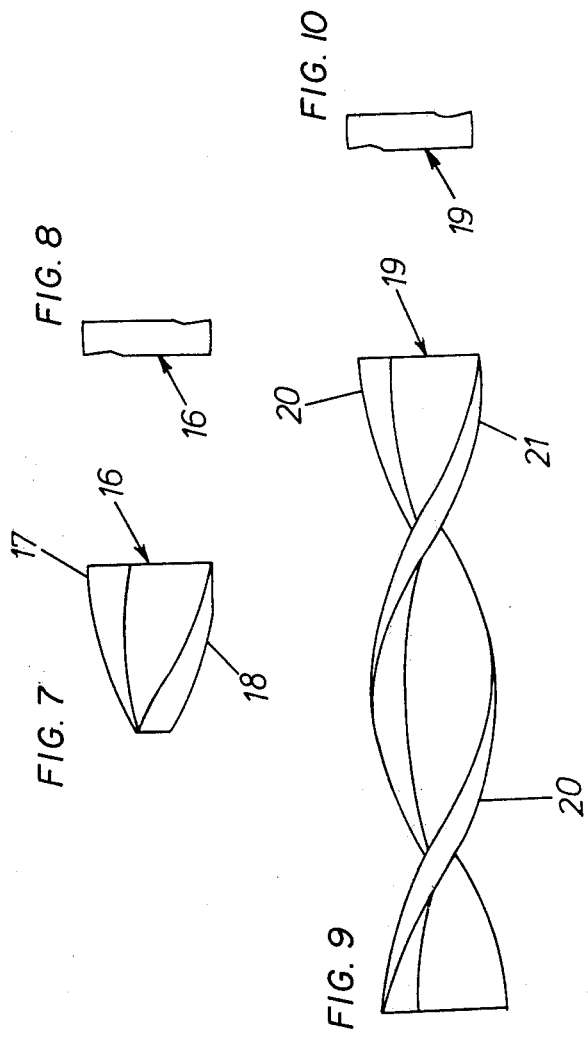

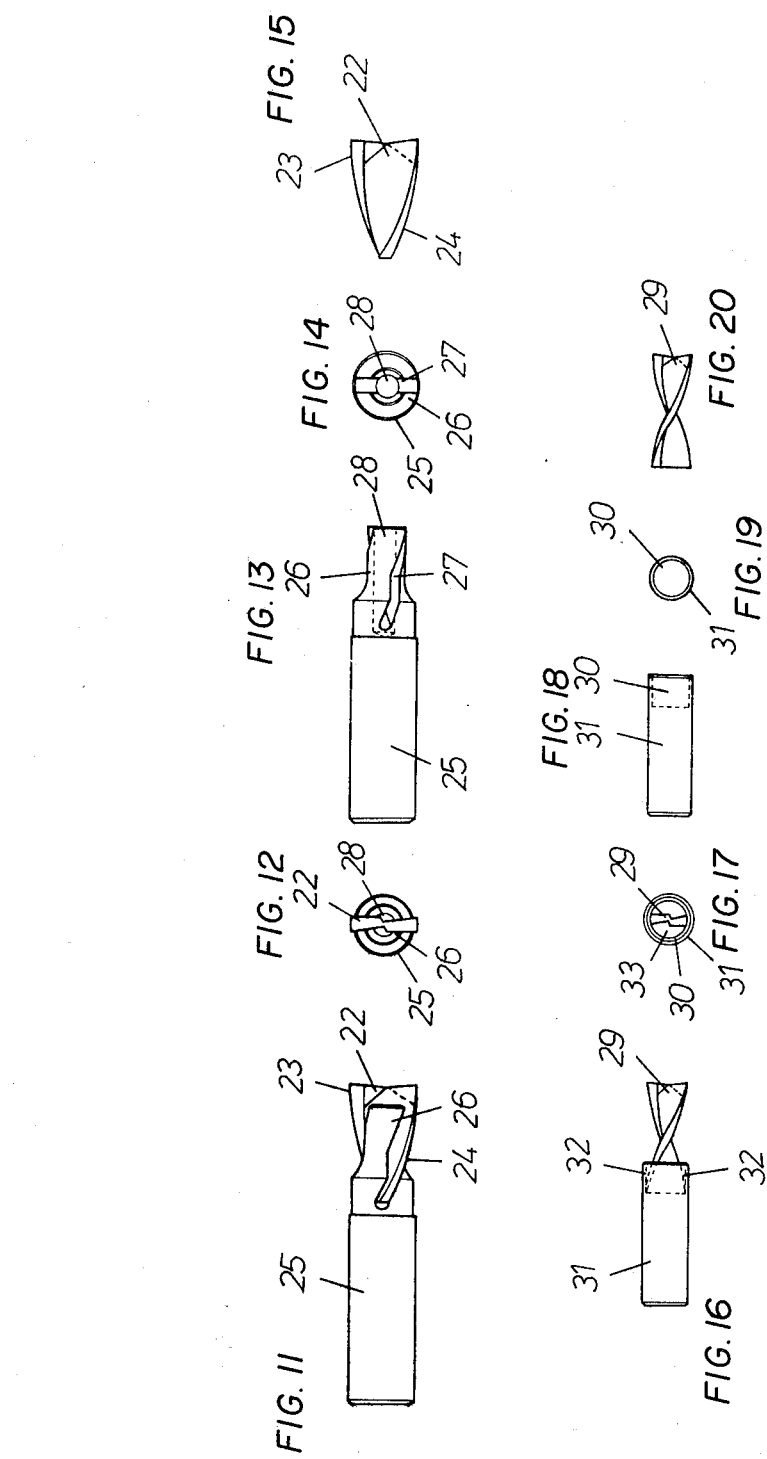

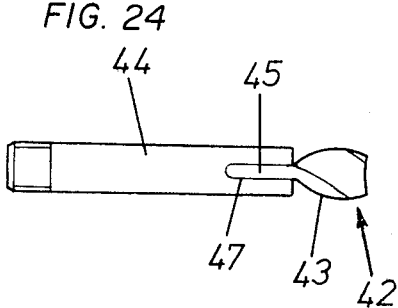
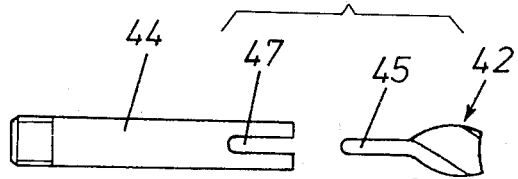
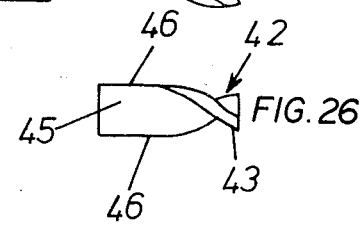
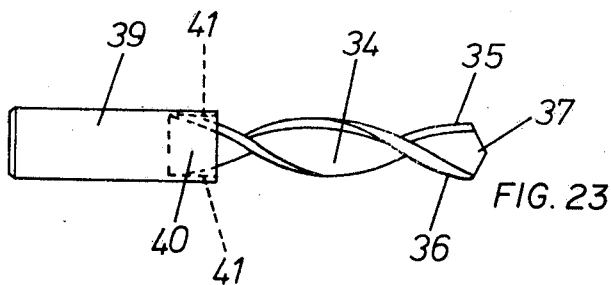
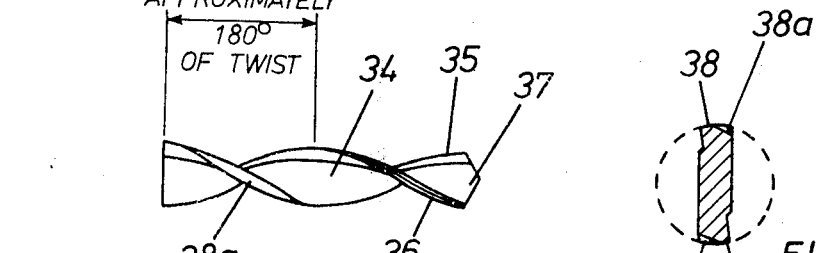
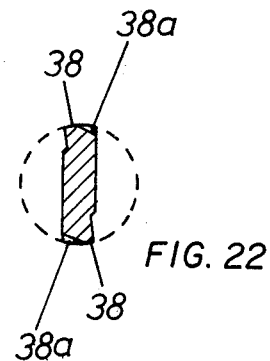

FLUTE PIECES FOR ENGINEERS TOOLS

DESCRIPTION OF PRIOR ART

Prior to the invention disclosed in our British Patent Specification No. 1,279,238 helical face pieces were made, for example, by powder metallurgical techniques involving moulding and sintering or by more conventional working of metallic materials followed by grinding to final shape. When using hard cutting materials, such as tungsten carbide of various grades, ceramics and high speed steel, it had been possible only to make short helical face pieces, that is helical face pieces of length less than one third of their lead. In many engineers' tools it was necessary to secure a number of such short helical face pieces to each flute, and furthermore to stagger the joins between the pieces on the different flutes in order to mitigate marking of a workpiece. The method and the apparatus described in our U.S. Pat. No. 1,279,238 made it possible for the first time to make, from hard cutting materials, helical face pieces whose lengths were greater than one third of their lead. The helical face pieces so provided were not complete tools in themselves, but still had to be secured to flutes of the engineers' tool upon which they were to be used. The hard cutting material of the face pieces did not extend through their axes. The advance of the prior art was to obviate the necessity of securing several face pieces to each flute, with staggering of the joins. The object of the present invention is to provide a flute piece in which secural of a face piece to each flute has been obviated altogether.

SUMMARY OF THE INVENTION

The invention provides a flute piece consisting of a piece of tungsten carbide twisted or formed such that the flute piece has at least two helical cutting edges and an axis through which the tungsten carbide material extends. The flute pieces are complete tools having integral flutes, and do not require face pieces to be brazed on to the flutes. The flute pieces are useful for engineers' tools for working ferrous or non-ferrous metal, plastics or wood, such as twist drills or milling or boring cutters for machine tools.

Flute pieces according to the invention may be made by a method or apparatus as described in our British Patent Specification No. 1,279,238 with a suitably shaped core former or formers.

A strip of tungsten carbide of suitable section can be treated accordingly. Suitable section includes rectangular or like section, sections having two opposed concave edges and sections shaped such that one or more coolant supply channels, as hereinafter described, extend down the flute piece. Alternatively the piece may be press formed or mechanically formed to the desired shape in the green stage and then sintered. The section of the strip may be specially shaped to enhance the strength of the web or other properties of the flute piece eventually produced. A multi-flute piece may be produced of three-legged, cruciform or like shape.

Flute pieces according to the invention may be provided with means for attachment to a tool body or shank. The tool body or shank may, for example, have a straight or helical sided slot or cylindrical hole for receiving an end of the flute piece which can be brazed or made to adhere or to clamp onto the tool body or shank. The tool body or shank may additionally or alternatively be provided with clamping means. The tool body or shank may be turned, milled or precision cast, for example, to the desired shape.

Flute pieces according to the invention may be provided with one or more coolant supply channels. The channels, through which coolant fluid may pass to the working area of the flute piece, also serve to break the chips formed from the metal workpiece by drilling, boring or milling. To enhance the chip breaking effect of the coolant supply channels, it is desirable that those on opposite faces of the flute piece should be offset from one another. It is emphasized, however, that this invention does include flute pieces in which the coolant supply channels on opposite faces are aligned, and flute pieces having only one coolant supply channel. The coolant supply channels may be of a variety of cross-sections, exemplary of which are rectangular, trapezoidal, and substantially semi-circular. The coolant fluid may pass down the channels under the influence of gravity, or may be force-fed down the channels to the working area.

Flute pieces according to the invention may, if desired, be ground to final shape. A drill point may for example be ground onto the flute piece. When worn, flute pieces can be thrown away and replaced with a saving in the time and expense of brazing new face pieces on to the flutes.

The invention will now be particularly described, by way of example only, with reference to the accompanying drawings, of which:

FIGS. 1 through 6 are partial and elevational views of six forms of flute pieces constructed in accordance with and embodying the present invention; portions behind each end face and extending outwardly beyond each end face not being shown;

FIG. 7 is a side elevational view of a further form of flute piece constructed in accordance with and embodying the present invention;

FIG. 8 is a partial end elevational view of the flute piece illustrated in FIG. 7;

FIG. 9 is a side elevational view of a still further form of a flute piece constructed in accordance with and embodying the present invention;

FIG. 10 is a partial end elevational view of the flute piece illustrated in FIG. 9;

FIG. 11 is a side elevational view of a milling cutter embodying a flute piece of the present invention;

FIG. 12 is an end elevational view of the milling cutter illustrated in FIG. 11;

FIG. 13 is a side elevational view of the shank of the milling cutter illustrated in FIG. 11;

FIG. 14 is an end elevational view of the shank of the milling cutter illustrated in FIG. 13;

FIG. 15 is a side elevational view of the flute piece of the milling cutter illustrated in FIG. 11;

FIG. 16 is a side elevational view of another form of milling cutter embodying a flute piece of the present invention;

FIG. 17 is an end elevational view of the milling cutter illustrated in FIG. 16;

FIG. 18 is a side elevational view of the shank of the milling cutter illustrated in FIG. 16;

FIG. 19 is an end elevational view of the milling cutter shank illustrated in FIG. 18;

FIG. 20 is a side elevational view of the flute piece of the milling cutter illustrated in FIG. 16;

FIG. 21 is a side elevational view of another form of flute piece constructed in accordance with and embodying the present invention;

FIG. 22 is a vertical transverse sectional view taken on the line 22—22 of FIG. 21;

FIG. 23 is a side elevational view of the flute piece illustrated in FIG. 21 mounted in a tool shank;

FIG. 24 is a side elevational view of a further form of milling cutter incorporating a flute piece invention; in accordance with and embodying the present inventon;

FIG. 25 is an exploded view of the milling cutter illustrated in FIG. 24; and

FIG. 26 is a side elevational view of the flute piece shown in FIGS. 24 and 25 rotated through an angle of 90°.

FIGS. 1 through 7 show part end elevations of flute pieces 1 to 6 all of which are formed from tungsten carbide. Parts extending beyond end faces 7 to 12 respectively of the flute pieces 1 to 6 are not shown. Flute pieces 3 to 5 have coolant supply channels 13 to 15 respectively. The coolant supply channels 13 to 15 on opposite faces of the flute pieces 3 to 5 respectively are offset from one another and, because of the overlapping paths of the channels 13 to 15 during rotation of the flute pieces, ensure good chip breaking effect. The channels 13 are shaped as the troughs of a wave, the channels 14 are part circular in cross-section and the channels 15 are trapezoidal in cross-section. Drill points may be ground on all the flute pieces 1 to 6 to make these flute pieces suitable for use in drilling tools. The flute piece 2 is, however, most suitable for use in a milling tool.

In FIGS. 7 and 8, a flute piece 16 is shown. This flute piece 16 is made of tungsten carbide and has a first helical edge 17 and a second helical edge 18. From the part end elevation it can be seen that the flute piece 16 is of similar form to the flute piece 2. The flute piece 16 extends for approximately 90° of twist or ¼ of its helix lead.

A tungsten carbide flute piece 19 in FIGS. 9 and 10, with helical edges 20 and 21, is identical to the flute piece 16 save in its length which is approximately 360° of twist or the length of its helix lead.

With reference to FIGS. 11 through 15, a tungsten carbide flute piece 22, with helical edges 23 and 24 and extending for approximately 90° of twist is shown in FIG. 15. The flute piece 22 is also shown mounted for use as a milling in FIG. 11, the mounting comprising a tool shank 25 and a tool body or extension web 26. The tool shank 25 and extension web 26 are also shown without the flute piece (FIG. 13). The extension web 26 is provided with a helical slot 27 into which the flute piece is brazed and a cylindrical hole 28 for ease of manufacture. As in previous end elevations parts of the flute piece 22 and of the helical slot 27 which extend outwardly behind the end face are omitted in FIG. 14 for clarity.

Similar views are shown in FIGS. 16 through 20 of a smaller milling tool. In this case, owing to the smaller diameter of the flute piece and consequently reduced stresses in use, it is not necessary to provide an extension web. A flute piece 29 is therefore brazed directly into a cylindrical hole or pot 30, of a tool shank 31, the brazing material securing the flute piece 29 to walls 32 of the pot 30. The pot 30 is filled with a metallic or plastics filling material 33, but could equally have been left empty.

A flute piece 34 in FIGS. 21 and 22 is formed from tungsten carbide and has a first helical edge 35 and a second helical edge 36. A drill point 37 has been ground onto this flute piece 34. In the sectional view it can be seen that a back-off grinding operation has been carried out to provide customary (to twist drills) cylindrical lands 38 on the leading end of the tool. The back-off grind has not been continued along the rear end of the tool, which therefore has a cylindrical diameter 38a.

FIG. 23 shows the flute piece 34 fitted in a tool shank 39 to make a twist drill. The tool shank 39 is similar to the tool shank 31 of FIG. 18, having a pot 40 onto walls 41 of which the flute piece 34 is brazed.

With reference to FIGS. 24 through 26 a cutter 42 is formed from a twisted strip of tungsten carbide such that its edges 43 are helical only in the section which will extend from the end of a tool shank 44 when the cutter 42 is attached thereto. A flat end portion 45, having straight edges 46 is provided on the cutter 42. The tool shank 44 is provided with a corresponding flat slot 47 of a size such that the end portion 45 of the cutter 42 may be brazed into the slot 47 of the tool shank 44.

What is claimed is:

1. An engineer's rotary tool for working ferrous and non-ferrous metals, plastics, and wood comprising an elongated flute piece having a longitudinal axis of rotation and formed entirely of tungsten carbide, said flute piece having at least two helical cutting edges symmetrical about said axis, an elongated shank having an extension web on one end thereof, said web having a slot formed transversely therethrough, said slot being helical and symmetrical about said axis and complementary to said helical cutting edges, and one end portion of said flute piece being engaged in said slot.

2. An engineer's tool as defined in claim 1 and further characterized by said flute piece having at least one coolant supply channel.

3. An engineer's tool as defined in claim 1 and further characterized by said flute piece having opposed face portions, a coolant supply channel provided in each face portion, said coolant supply channels being in offset relation to each other.

4. An engineer's tool as defined in claim 2 and further characterized by said coolant supply channel having a base portion Parti-circular in cross-section.

5. An engineer's tool as defined in claim 2 and further characterized by said coolant channel having a base portion trapezoidal in cross-section.

6. An engineer's tool as defined in claim 2 and further characterized by said coolant channel having a base portion of wave-form.

7. An engineer's tool as defined in claim 1 and further characterized by said web having a central cylindrical hole longitudinally coincident with said slot and coaxial with said axis of rotation.

8. An engineer's tool as defined in claim 1 and further characterized by said one end portion of said flute piece being brazed in said slot.

* * * * *